United States Patent Office 3,156,618
Patented Nov. 10, 1964

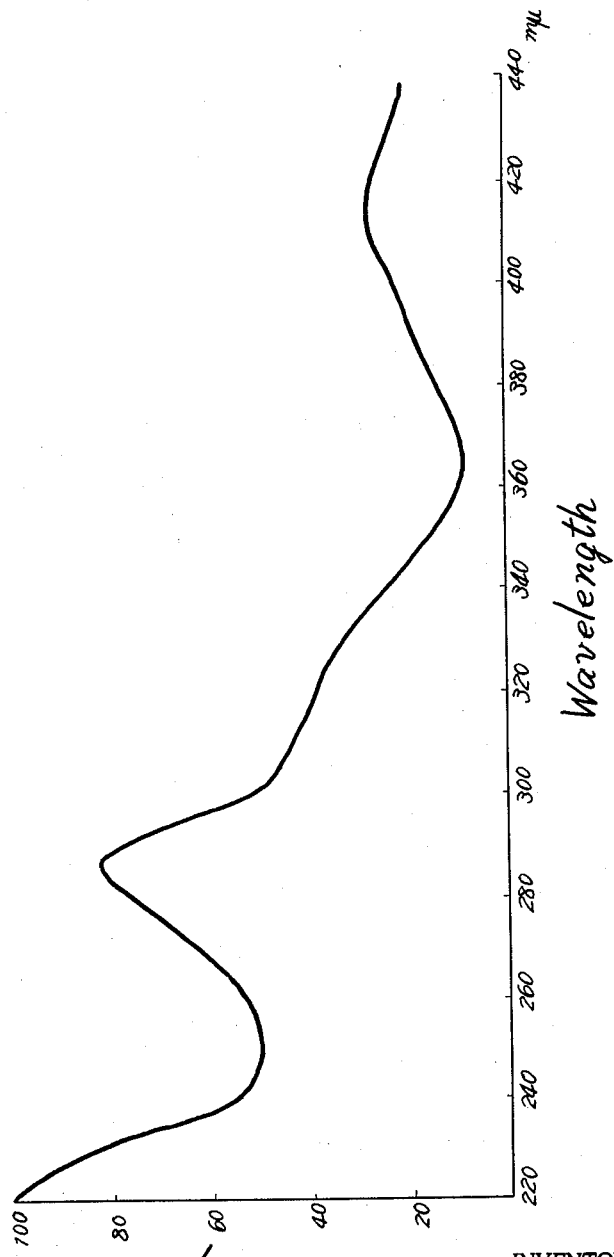
Fig. 1 Visible and Ultraviolet spectrum of ascochytin

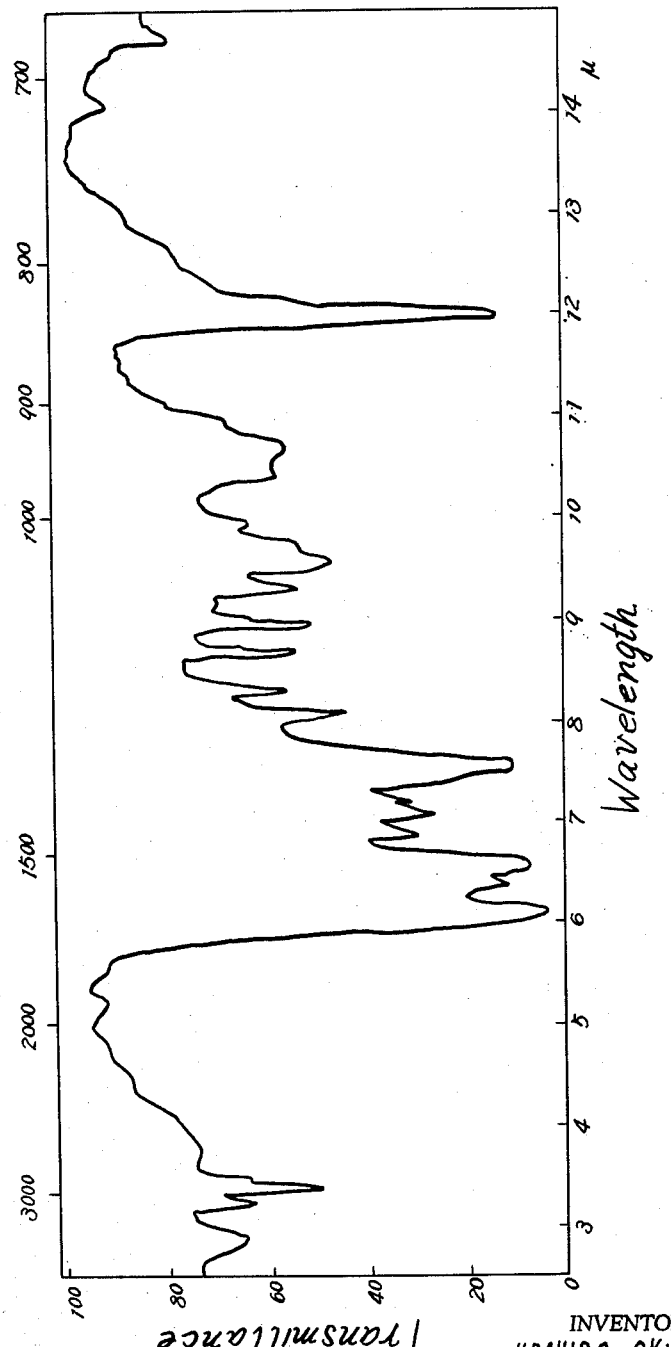

3,156,618
SUBSTANCE POSSESSING ANTIMICROBIAL ACTIVITY AND DISEASE CONTROL ACTIVITY ON SOME PLANT DISEASES AND THE METHOD FOR ITS PRODUCTION
Hachiro Oku and Toshiro Nakanishi, Tokyo, Japan, assignors to Sankyo Company, Limited, Tokyo, Japan
Filed Jan. 24, 1963, Ser. No. 253,721
Claims priority, application Japan, Feb. 8, 1962, 37/3,940
2 Claims. (Cl. 167—65)

This invention relates to a new and useful substance possessing antimicrobial activity and disease control activity on some plant diseases, and to the method for its production. More particularly, it relates to a new and useful antibiotic called ascochytin and to the method for production of the antibiotic.

It is an object of this invention to provide a new and useful antibiotic, ascochytin.

Another object of this invention is to provide method of producing this antibiotic, ascochytin, by microbiological processes.

Physical and chemical properties of ascochytin are shown below.

PHYSICAL AND CHEMICAL PROPERTIES OF ASCOCHYTIN

Ascochytin is a slightly acidic yellow needle crystalline substance and melts at 200~201° C. with decomposition. The analytical data are as follows:

Calc'd for $C_{15}H_{16}O_5$: C, 65.21; H, 5.84; O, 28.95. M.W. 276.28. Found: C, 65.66; H, 5.91; O, 28.43. M.W. 284.54 (measured by osmometer).

It contains no nitrogen, halogen, sulfur or phosphorus.

The degree of specific rotation of ascochytin is $[\alpha]_D^{25}=-85.99°$ (c.=1 in chloroform).

The visible and ultraviolet absorption spectrum is shown in FIG. 1. It has two characteristic absorption maxima at 286 m$\mu$ and at 415 m$\mu$ in an ethanol solution. The infrared absorption spectrum of ascochytin is shown in FIG. 2. It exhibits characteristic absorption bands in the infrared region of the spectrum, in a potassium-bromide pellet, at the following frequencies expressed in reciprocal centimeters: 3100, 2950, 1640, 1590, 1530, 1460, 1410, 1340, 1250, 1200, 1160, 1120, 1070, 1050, 1005, 960, 935, and 835.

Ascochytin is very soluble in chloroform, moderately in methanol, ethanol, acetone, ethylacetate, ethylether, benzene, ethylenglycol, and sparingly soluble in n-hexane and petroleum ether, but almost insoluble in water. It gives a strong greenish fluorescence in ethanol solution under the ultraviolet ray.

Its yellow color in ethanol is decolorized by addition of magnesium acetate, one drop of N NaOH or hydrosulfite. Potassium permanganate is decolorized. It gives a red ferric-chloride reaction in ethanol and does not reduce Fehling's solution.

THE MICROORGANISM

The above-described new antibiotic, ascochytin can be produced by cultivation of a microorganism called Ascochyta fabae Spegazzini on a suitable nutrient medium. The method for production of ascochytin by microbiological process will be described below.

The microorganism useful for the preparation of ascochytin, Asocohyta fabae Spegazzini, is a pathogenic fungus of broad bean (Vicia faba L.) belonging to Phomaceae (Sphaerioidaceae), Phomales (Sphaeropsidales), Fungi Imperfecti, and the detailed nature of this fungus is described by H. Yoshii, in Ann. Phytopath. Soc. Japan 17: 175 (1953) and by K. Yoshino in Nogyosekai 1:61 (1906).

THE ANTIBIOTIC

The production of ascochytin in accordance with the present invention is carried out by inoculating a sterile aqueous nutrient medium with Ascochyta fabae Spegazzini, incubating the incoculated medium under aseptic aerobic conditions at a temperature between about 23~30° C., and isolating the desired ascochytin from the solid material present in the culture mixture and the aqueous culture liquid.

For the inoculation, spores and/or mycelium of Ascochyta fabae Spegazzini can be used. A piece of mycelium is sufficiently used as the inoculum. For large scale of fermentations it is preferable to use vigorous, young cultures of the microorganism.

Suitable aqueous nutrient media are those having a pH between 5 and 10, preferably between 6.5~9.0, and containing an assimilable carbon source, a source of nitrogen and minerals. As the assimilable carbon sources, either pure carbohydrates or commercially available carbohydrate mixtures may be used. Some examples of the materials which are suitable for this purpose include glucose, mannose, lactose, sucrose, maltose, xylose, soluble starch and the like. The quantity of the carbohydrates present in the nutrient medium is not particularly critical and can vary from about 0.5% to 8% by weight of the total weight of the medium.

The source of nitrogen in the nutrient medium may be of an organic, inorganic, or mixed organic-inorganic nature. Some examples of the many nitrogenous substances which may be employed in the nutrient medium are peptones, amino acids, hydrolyzed and unhydrolyzed proteins, soybean meal, corn steep liquor, inorganic nitrates, urea, ammonium salts and the like. Due to the crude nature of most of the readily available nitrogenous substances, the quantity to be added to the nutrient medium varies somewhat in accordance with purity. However, it can be said for practical purposes that nitrogenous materials need not exceed 4% by weight of the total weight of the fermentation medium.

A certain amount of mineral salts and vitamines are necessary to obtain the best yields of ascochytin. In general, it is usually advantageous to add a small amount of inorganic salts, such as phosphate, ferrous salts, potassium salts, magnesium salt and so on. As to vitamins, although addition of small amount of vitamin $B_1$, biotin, Ca-pantothenate and the like is advantageous, they are not always necessary for the production of ascochytin because the other crude materials to be added into the nutrient medium contain fairly sufficient amounts of these substances.

It is because the yields of the antibiotic ascochytin is considerably reduced by the operation beyond the scope of pH between 5.0 and 10 that the aforementioned scope has been specified in the present invention.

The cultivation of Ascochyta fabae Spegazzini in the aqueous nutrient medium can be carried out in a number of different ways. For example, the microorganism can be cultivated under aerobic conditions on the surface of the medium or it can be cultivated beneath the surface of the medium, that is, in the submerged condition, if oxygen is simultaneously supplied.

The preferred method for producing ascochytin on a large scale involves the use of submerged or deep cultures of Ascochyta fabae Spegazzini. According to this embodiment of the invention, a sterile, aqueous nutrient medium is inoculated with Ascochyta fabae Spegazzini and incubated with agitation and aeration at a temperature between about 20~32° C., preferably in the neighborhood of 23~30° C., until a maximum concentration of ascochytin has been produced in the culture liquid.

The length of time required for the maximum production of ascochytin varies with the size and type of equipment used. For example, in large-scale commercial fermentation such as one carried out in the tank-type fermentors, maximum production of ascochytin is reached in about four to ten days. Incubation time varies with the incubation method of inoculation and the like. Therefore, longer period of incubation does not reduce the yield of ascochytin suddenly, unless otherwise the pH of culture medium shifts beyond the scope between 5 and 10. Under submerged culture conditions, the microorganism develops as more or less discrete particles dispersed throughout the nutrient medium in contrast to the more or less continuous pellicle present on the surface of the medium in the surface culture method. By virtue of this distribution of the organism throughout the medium, large volumes of the inoculated nutrient medium can be cultivated at one time in the large tanks and vats customarily employed in the fermentation industry. Stationary vat fermentors equipped with suitable agitation and aeration devices as well as horizontal rotary drum fermentors have been found to be particularly useful in this respect. However, for the preparation of smaller quantities of the antibiotic or of cultures of the microorganism, the submerged culture method may be carried out in small flasks or jars which are either shaken or stirred by suitable mechanical means.

Agitation and aeration of the culture mixture may be accomplished in a number of ways. Agitation may be provided by turbines, paddles, impellers or other mechanical agitation devices, by revolving or shaking the fermentor itself, by various pumping devises or by the passage of air through the medium. Aeration may be effected by injecting air into the fermentation mixture through open pipes, perforated pipes, porous diffusion media such as carbon sticks, Carborundum, sintered glass and the like, or it may be provided by spraying, splashing or spilling the mash into or through oxygen-containing atmosphere.

In order to isolate the effective substance present in the culture mixture after completion of the fermentation phase of the process, the conventional means usually used for the isolation of effective compounds contained in various fermentation mixture may be conveniently employed. On isolating ascochytin from the above-described sources, such means as concentration of the effective substance, removal of impurities and conversion to composition capable of being more readily purified are used in accordance with and by the use of the properties of ascochytin. Difference in solubilities in various solvent from the other impurities contained in culture mixture, partition coefficients into two liquid layers, absorption affinities, and degree of dissociation of hydrogen ion are the means being made use of. As the embodied operations applying these means are involved, for example, dissolution or extraction with solvents, and precipitation from solvents.

The methods of isolation of ascochytin by the use of aforementioned means will be in details described below. These detailed method are, however, to be understood as illustrative but not limited to it.

Upon treating the liquid culture mixture containing mycelium it is preferable to carry out extraction by the use of solvents which dissolve ascochytin but are immiscible with water, such as for example, chloroform, ethyl acetate and so on. It is desirable to conduct the extraction at a pH between 3.0 and 5.0 but pH below or higher than the above may be applicable.

Upon subjecting the solid material containing mycelium and the culture filtrate separately to isolation procedures, ascochytin in the liquid phase can be separated from impurities by the use of difference in partition coefficient between aqueous and organic-solvent layers in the same way as described above, and the antibiotic present in the solid material containing mycelium can be extracted with suitable solvents capable of dissolving the antibiotic such as methanol, ethanol, acetone, chloroform, acetic acid esters and the like.

When the culture liquid containing or without mycelium is concentrated or solidified by vacuum distillation or spray drying, ascochytin can be isolated in the same way as described in the aforementioned case of solid material containing mycelium. If the degree of concentration is low the treatment is effected in the same way as described above regarding the case of liquid culture mixture. Ascochytin dissolved in the solvent can be isolated by removing the solvent by such means as vacuum distillation. Alternatively, it may be isolated by precipitating it following addition of a solvent in which it is sparingly soluble, such as for example, petroleum ether or water, to the solution. Further alternatively, the effective substance may be isolated by removing the impurities by washing the residue with solvent in which aschochytin is almost insoluble after removing the solvent in which it is dissolved.

Ascochytin thus obtained is readily crystallized as the crude crystals when allowed to stand, preferably at low temperatures, after removal of the solvent to a suitable degree. The crude ascochytin can be purified by treating it with various organic solvents, a solvent or solvent mixtures such as, for example, methanol, ethanol, acetone, benzene and the like through procedures such as concentration, standing and cooling.

In view of the aforementioned properties of ascochytin it is conceivable that the substance obtained by the invention is a new one and may be easily isolated.

Examples will be shown below where combinations of plural methods of isolation are shown. However it will be understood from the descriptions above that by each single method of isolation also may be carried the process according to this invention. Now that properties of the effective substance are disclosed as above it will be evident by those skilled in the art that the object of this invention can be attained also by other alternations or modified methods which are not concretely described in the specification of the present invention.

BIOLOGICAL PROPERTIES OF ASCOCHYTIN

Antimicrobial spectrum of ascochytin was examined by two fold agar dilution method for a period of 1~4 days. The antibiotic was dissolved in a small amount of dimethylformamide and diluted with sterilized water to give a final agar medium containing less than one percent of the solvent, which was not a harmful concentration against the organisms tested. Studies with animal parasitic bacteria were conducted in a Bacto Nutrient Agar (which is manufactured and sold by Difco Lab.). For plant pathogenic bacteria and fungi potato-sucrose agar medium was used. Yeasts and Trichophytons were tested in Sabouraud medium. The results are shown in Table 1.

Ascochytin is found to have a very broad spectrum. It is effective against some plant pathogenic bacteria, yeasts, and fungi.

*Table 1.—Antimicrobial Spectrum of Ascochytin*

| Test organism | Minimum inhibitory concentration (mcg./ml.) |
|---|---|
| Bacteria: | |
| *Bacillus subtilis* | 3 |
| *Staphylococcus aureus* 209 P | >100 |
| *Sarcina lutea* | >100 |
| *Escherichia coli* | >100 |
| *Pseudomonas aeruginosa* | 100 |
| *Xanthomonas oryzae* | 3 |
| *Bacterium pruni* | >100 |
| *Erwinia aroideae* | >100 |
| Yeasts: | |
| *Zygosaccharomyces sulsus* | 50 |
| *Saccharomyces cerevisiae* | 100 |
| *Candida albicans* | 50 |

Table 1—Continued Fungi:
- Piricularia oryzae _____ 1.5~3
- Glomerella cingulata _____ 3
- Cochliobolus miyabeanus _____ 100
- Alternaria kikuchiana _____ 50
- Gloeosporium kaki _____ 12.5
- Gloeosporium laeticolor _____ 50
- Gibberella saubinetii _____ 12.5
- Gibberella fujikuroi _____ >100
- Fusarium nivenum _____ >100
- Fusarium lycopersici _____ >100
- Fusarium lini _____ 100
- Aspergillus niger _____ >100
- Aspergillus oryzae _____ 100
- Penicillium digitatum _____ 25
- Penicillium italicum _____ 50
- Trichophyton interdigitale _____ 50
- Trichophyton rubrum _____ 50
- Trichophyton asteroides _____ 50

Ascochytin is a potent inhibitor of spore germination of some plant pathogenic fungi. This was examined as follows. One drop of spore suspension containing a desired concentration of ascochytin was placed on a slide glass and kept in moist chamber at 27° C. After an adequate period of incubation (3 hours for Cochliobolus miyabeanus and 16 hours for Piricularia oryzae), the spores were killed by addition of one drop of Lugol-solution, and the percentage of germinated spores was calculated under a microscope.

The result is shown in Table 2.

Table 2.—Inhibition of Spore Germination in Some Plant Pathogenic Fungi by Ascochytin

| Concentration of ascochytin (mcg./ml.) | Percent germination | |
|---|---|---|
| | Piricularia oryzae | Cochliobolus miyabeanus |
| 100 | 0 | 0 |
| 50 | 0 | 0 |
| 25 | 0 | 0 |
| 12 | 0 | 3.9 |
| 6 | 0 | 52.2 |
| 3 | 10.8 | 68.7 |
| 1.5 | 29.3 | 92.8 |
| 0.8 | 75.9 | 98.2 |
| 0 | 96.2 | 99.6 |

As is shown in the above table, ascochytin completely inhibits the spore germination of Piricularia oryzae at the concentration of 6 p.p.m. and of Cochliobolus miyabeanus at 25 p.p.m.

Ascochytin is found to be a valuable substance for control of some plant diseases.

The protective effect of ascochytin against blast disease of rice plant (Oryza sativa L.) was found out by the following examinations. The young seedling of rice plants (the variety Shigaasahi No. 27) grown in small pots for about 4 weeks were sprayed with 10 ml. of aqueous suspension of wettable powder of ascochytin per pot. The ascochytin concentration of sprayed solution was 1000 p.p.m. After drying, the test plants were inoculated with a conidial suspension of blast fungus, Piricularia oryzae Cav., and kept in a moist chamber at (97% relative humidity) at 23° C. for 48 hours. Untreated plants were also inoculated simultaneously as the check. The inoculated plants are then transferred into a greenhouse. At 3 days after inoculation, the diseased degree was determined on treated and check plants as the percentage of diseased leaves.

Table 3.—Protective Effect of Ascochytin Against blast Disease of Rice Plant

| Treatment | Number of total leaves examined | Number of leaves diseased | Percentage of diseased leaves |
|---|---|---|---|
| Ascochytin, 1000 p.p.m | 62 | 16 | 26 |
| None (check) | 46 | 34 | 74 |

As is shown in Table 3, the susceptibility of rice plant to blast disease was markedly reduced by treatment with ascochytin at the concentration of 1000 p.p.m.

The protective effect of ascochytin against late blight disease of tomato was examined by two days, namely by detached leaf method and by inoculation test in greenhouse.

The detached leaf method was carried out as follows: A suspension of wettable powder of ascochytin was sprayed on newly cut tomato leaves. The content of ascochytin in the sprayed solution was 1000 p.p.m. After drying, fine treated leaves were put into a 15 cm. petri dish and inoculated with a drop of spore suspension of late blight fungus, Phytophthora infestans de Bary. Then, the inoculated leaves were kept in a controlled chamber of 20° C. temperature and 100% relative humidity. As the check, untreated leaves were inoculated simultaneously. At 5 days after inoculation, diseased degree of the cut leaves was determined. Diseased degree was estimated as follows:

The symptoms of tomato leaves were divided into 6 grades according to the size of lesions, for example, healthy leaf was marked as 0, . . . , and the largest lesion as 5. The effect of ascochytin treatment was expressed as the percentage of total marks of lesions in treated leaves to that of untreated ones.

Table 4.—Protective Effect of Ascochytin Against Tomato Late Blight Disease Examined by Detached Lead Method Treatment: Disease index
- Ascochytin, 1000 p.p.m. _____ 35.6
- None (check) _____ 100

As the results cited in Table 4, ascochytin gave a good protective effect against late blight disease of tomato.

The inoculation test of tomato late blight disease in greenhouse was conducted as follows: Tomato seedlings (the variety Shinfukuju) grown in the greenhouse for a month were sprayed with the suspension of ascochytin wettable powder which contains 1000 p.p.m. ascochytin. After 24 hours, the treated and untreated check tomato seedings were inoculated with a spore suspension of late blight fungus of tomato and were incubated for 24 hours in a moist chamber at 20~23° C., and then, they were transferred into the greenhouse. The result of observation at 3 days after inoculation is shown in Table 5. The method of estimation of lesion is the same as in the detached leaf test described above.

Table 5.—Protective Effect of Ascochytin Against Tomato Late Blight Disease Examined by Greenhouse-Inoculation Test

| Treatment | Total number of leaves observed | Average of disease index per leaf |
|---|---|---|
| Ascochytin, 1000 p.p.m | 136 | 2.02 |
| None (check) | 120 | 4.01 |

Untreated tomato seedlings were entirely withered at 5 days after inoculation, while the ascochytin treated tomatoes were still alive.

From the results of aforementioned experiments it was found that ascochytin is a very effective protectant in agricultural use not only against blast disease of rice plant but also against tomato late blight disease. In the above experiments, no phytotoxicity was observed.

Ascochytin may be used in suitable forms, such as for example, powdery mixture with inactive diluent, emulsifiable solution with organic solvent and compatible surface active agents, wettable powder with inactive diluent and adequate surface active agents, and granule with inactive diluent and small amount of water. In such cases, ascochytin may be conveniently used in concentration between 0.1 and 10 percent of the preparations. Ascochytin may be employed, if desired, in combination with other antimicrobial or plant chemotherapeutic agents.

The following examples illustrate suitable methods for preparing, purifying and fractionating aschochytin.

EXAMPLE 1

One hundred ml. portions of a medium containing 2 g. of glucose, 0.5 g. of peptone, 0.1 g. of dibasic potassium phosphate, 0.5 g. of potassium chloride, 0.05 g. of magnesium sulfate, 0.001 g. of ferrous sulfate, 0.3 mg. of thiamine, 0.1 mg. of vitamin $B_6$, 0.1 mg. of vitamin $B_2$, and 0.3γ of biotin are placed into each of one hundred of 500 ml.=shaking fermentation bottles in the conventional way. After sterilization, one loopful of mycelium of *Ascochyta fabae* Spegazzini cultivated on potato-sucrose agar slant is inoculated and the inoculated bottles are incubated with shaking at 26° C. for 8 days. The production of ascochytin then reaches to between 20 and 40 γ/ml. in the broth.

The culture media are collected and the mycelium is separated by filtration. The wet mycelium weighs 500 g. and is subjected to extraction with 2.5 kg. of acetone. The solvent is distilled off in vacuum and the remaining rich water is extracted with chloroform. This chloroform solution is treated by the same way as the case of chloroform extract prepared from the culture filtrate.

The culture filtrate, 7.5 l. in volume, is acidified with N-HCl to pH 3~4, and is extracted with ⅕ volume of chloroform. The extract is concentrated to remain a gummy brown substance. This substance is dissolved in hot n-hexane by repeated extractions, and then the hexane is distilled off under reduced pressure. The remaining yellow solid substance is crystallized from hot ethanol. Recrystallization from ethanol, benzene or acetone gave a light yellow fine needle or plate. Pure ascochytin thus obtained is weighing 350 mg.

EXAMPLE 2

Three hundred liters of nutrient liquid containing 2% of glucose, 0.25% of peptone, 0.2% of dibasic potassium phosphate, 0.05% of potassium chloride, 0.1% of magnesium sulfate and 0.001% of ferrous sulfate is placed in a 600 l.=fermentation tank. The medium is sterilized under pressure by the conventional method and inoculated with 3 l. of shake culture of *Ascochyta fabae* Spegazzini (cultured at 26° C. for 4 days). The inoculated medium is incubated at 26°±1° C. with aeration of 300 l. per minute and agitation of 250 r.p.m. After 146 hours of incubation 280 l. of culture liquid (including mycelium) containing 40 γ/cc. of ascochytin is obtained.

EXAMPLE 3

Two hundred and eighty liters of culture liquid of *Ascochyta fabae* Spegazzini (containing 11.2 g. of ascochytin) obtained in the same way as in Example 2 is acidified to pH 3.4 with hydrochloric acid and 140 l. of chloroform is added to the acidified liquid. The mixture is agitated and separated by a centrifuge into 3 parts, waste broth, mycelium and chloroform layer. The waste broth and mycelium are discarded because of their low content of ascochytin. The chloroform extract is concentrated in vacuum to give a gummy substance. This gummy substance is dissolved in hot n-hexane by repeated extractions until no color is given in the extract. The solution is concentrated in vacuum to leave a yellow solid substance. This solid substance is dissolved in 500 ml. of hot ethanol and allowed to stand overnight in a refrigerator and the yellow crystals formed are collected and dried to obtain 9.5 g. of crude ascochytin of 85% purity.

EXAMPLE 4

Two hundred and eighty liters of the culture liquid obtained in the same way as in Example 2 is adjusted to pH 3.4 with hydrochloric acid and 140 l. of chloroform is added to the acidified liquid. After the mixture is agitated vigorously, the chloroform layer is separated by centrifugation, and concentrated in vacuum to about 3 l. This concentrated solution is passed through a column of dibasic calcium phosphate. The black impurities are adsorbed in the upper part of the column, and ascochytin is contained in the effluent. The column is further washed with chloroform until to give a colorless effluent. The effluent thus obtained is concentrated in vacuum to dryness and the remaining solid substance is crystalized from ethanol. The crude ascochytin obtained in this method is 9.3 g. (purity 85%). Five grams of crude ascochytin are dissolved in 200 ml. of boiling ethanol. Insoluble matter is filtered off and the filtrate is allowed to stand in refrigerator for overnight. The resulting crystals are collected and recrystallized 3 times in the same way described above. The pure crystal of ascochytin thus obtained is 2.3 g. of light yellow fine needle and melted at 200~201° C. with decomposition.

We claim:

1. Ascochytin, a substance being a slightly acidic, light yellow needle crystal; containing the elements carbon, hydrogen and oxygen; being very soluble in chloroform, moderately soluble in methanol, ethanol, acetone, ethylacetate, ethylether, benzene, ethyleneglycol, sparingly soluble in n-hexane and petroleum ether, and almost insoluble in water; giving a strong greenish fluorescence in solution under ultra-violet ray, giving a red color with ferric chloride reagent in ethanol, decolorizing potassium permanganate, giving negative Fehling's test, being decolorized with magnesium acetate, sodium hydroxide and hydrosulfite; melting at a temperature in the range of 200~201° C. with decomposition; having a degree of optical rotation $[\alpha]_D^{25}$ of −85.99° (1% in chloroform); having analytical data: C, 65.66; H, 5.91; O, 28.43; having visible and ultra-violet absorption spectra in ethanol solution exhibiting two maxima at 415 and 236 mμ; and exhibiting characteristic absorptions in the infrared region on the spectrum in potassium bromide pellet, at the following frequencies expressed in reciprocal centimeters: 3100, 2950, 1640, 1590, 1530, 1460, 1410, 1340, 1250, 1200, 1160, 1120, 1070, 1050, 1005, 960, 935, and 835.

2. A process for the production of ascochytin which comprises cultivating *Ascochyta fabae* Spegazzini under aerobic conditions at a temperature in the range of from 20 to 32° C. in an aqueous nutrient medium having a pH between 5 and 10 and containing an assimilable carbon source, a source of nitrogen and minerals, and recovering ascochytin so produced from the medium.

References Cited in the file of this patent

Ann. Phytopath. Soc. Japan, 17, 175 (1953).